United States Patent
Krishna et al.

(10) Patent No.: US 12,470,428 B1
(45) Date of Patent: Nov. 11, 2025

(54) SYSTEMS AND METHODS FOR MONITORING AND ANALYZING THE STRUCTURE OF A VEHICLE CONTROLLER AREA NETWORK

(71) Applicant: FCA US LLC, Auburn Hills, MI (US)

(72) Inventors: Naveen Bangalore Rama Krishna, Auburn Hills, MI (US); Sricharan Maruneni, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/749,744

(22) Filed: Jun. 21, 2024

(51) Int. Cl.
*H04L 12/40* (2006.01)

(52) U.S. Cl.
CPC ......... *H04L 12/40006* (2013.01); *H04L 2012/40273* (2013.01)

(58) Field of Classification Search
CPC ........... H04L 12/40006; H04L 2012/40273
See application file for complete search history.

(56) References Cited

U.S. PATENT DOCUMENTS

| | | | |
|---|---|---|---|
| 9,576,137 B2 | 2/2017 | Habel et al. | |
| 10,628,129 B2 | 4/2020 | Gondalia et al. | |
| 10,664,243 B2 | 5/2020 | Weigert | |
| 10,670,695 B2 | 6/2020 | Maher et al. | |
| 10,855,460 B2 | 12/2020 | Takemori et al. | |
| 2013/0018567 A1* | 1/2013 | Lim | B60W 50/085 701/102 |
| 2018/0225968 A1* | 8/2018 | Wang | G01S 7/4808 |
| 2019/0375354 A1* | 12/2019 | Akella | B60R 16/037 |
| 2020/0106826 A1* | 4/2020 | Kulkarni | H04W 4/48 |
| 2021/0272392 A1* | 9/2021 | Erdelyi | G07C 5/008 |
| 2022/0271941 A1 | 8/2022 | Ramasamy Muthusamy et al. | |
| 2023/0204386 A1* | 6/2023 | Kitahara | G08G 1/09 701/450 |

FOREIGN PATENT DOCUMENTS

| | | |
|---|---|---|
| CN | 112793530 A | 5/2021 |
| CN | 117864043 A | 4/2024 |

* cited by examiner

*Primary Examiner* — Henry Tsai
*Assistant Examiner* — Harry Z Wang
(74) *Attorney, Agent, or Firm* — Jeremy J. Klobucar

(57) ABSTRACT

A system for analyzing a structure of a vehicle controller area network (CAN) is configured to obtain a level 2 (LV2) application software module, process the LV2 application software module to extract a set of LV2 variables from the LV2 application software module, obtain a plurality of lists of signals corresponding to a plurality of development teams of the vehicle, process the plurality of lists of signals to extract respective sets of LV2 signals from the plurality of lists of signals, generate a LV2 variable map based on the extracted set of LV2 variables and the extracted sets of LV2 signals, and generate a LV2 signal report detailing a set of inconsistencies based on an analysis of the generated LV2 variable map.

16 Claims, 3 Drawing Sheets

SYSTEMS AND METHODS FOR MONITORING AND ANALYZING THE STRUCTURE OF A VEHICLE CONTROLLER AREA NETWORK

FIELD

The present application generally relates to a vehicle controller area network (CAN) and, more particularly, to systems and methods for monitoring and analyzing the structure of a vehicle CAN.

BACKGROUND

Vehicle software is generally divided into base software (BSW) and two levels of application software (ASW). These two levels of ASW can be divided into Level 1 (primary) ASW and Level 2 (secondary) ASW. The primary purpose of the Level 2 ASW is for validation of the Level 1 ASW outputs for functional safety. A controller area network (CAN) of a vehicle is configured to transmit a very large quantity (e.g., hundreds or thousands) of different types of signals, and many of these signals are utilized by multiple software modules. During vehicle development, different teams may be tasked with the development of a particular set of software modules. Currently, analysis of these CAN signals, such as for functional safety verification, is performed manually by human operators and in a distributed (e.g., team-by-team) manner. This process is slow (e.g., 1-2 weeks minimum) and increases exponentially as vehicles incorporate more CAN signals and controllers. Accordingly, while such conventional vehicle CAN structure analysis techniques do work for their intended purpose, there exists an opportunity for improvement in the relevant art.

SUMMARY

According to one example aspect of the invention, a system for analyzing a structure of a vehicle controller area network (CAN) is presented. In one exemplary implementation, the system comprises a non-transitory computer-readable medium having a set of instructions stored thereon and one or more processors configured to execute the set of instructions, which causes the one or more processors to obtain a level 2 (LV2) application software module, process the LV2 application software module to extract a set of LV2 variables from the LV2 application software module, obtain a plurality of lists of signals corresponding to a plurality of development teams of the vehicle, process the plurality of lists of signals to extract respective sets of LV2 signals from the plurality of lists of signals, generate a LV2 variable map based on the extracted set of LV2 variables and the extracted sets of LV2 signals, and generate a LV2 signal report detailing a set of inconsistencies based on an analysis of the generated LV2 variable map.

In some implementations, the plurality of lists of signals includes at least two of a CAN mapping list, a hardware input/output (HWIO) mapping list, an inter-processor/core (IP/IC) mapping list, and a serial peripheral interface (SPI) mapping list. In some implementations, the plurality of lists of signals includes the CAN mapping list, the HWIO mapping list, the IP/IC mapping list, and the SPI mapping list.

In some implementations, the LV2 signal report includes, for each identified inconsistency, a recommendation to either (i) not change the particular inconsistency, (ii) add an output corresponding to the particular inconsistency, and (iii) remove the inconsistency. In some implementations, the LV2 application software module is a secondary application software module that is configured for verification of an output of at least one corresponding level 1 (LV1) or primary application software module for functional safety requirements.

In some implementations, the LV2 application software module is a model-type file. In some implementations, each of the plurality of lists of signals is a spreadsheet-type file. In some implementations, the LV2 signal report is a spreadsheet-type file.

According to another example aspect of the invention, a computer-implemented method for analyzing a structure of a vehicle CAN is presented. In one exemplary implementation, the computer-implemented method comprises obtaining, by a computing system comprising one or more processors, a LV2 application software module, processing, by the computing system, the LV2 application software module to extract a set of LV2 variables from the LV2 application software module, obtaining, by the computing system, a plurality of lists of signals corresponding to a plurality of development teams of the vehicle, processing, by the computing system, the plurality of lists of signals to extract respective sets of LV2 signals from the plurality of lists of signals, generating, by the computing system, a LV2 variable map based on the extracted set of LV2 variables and the extracted sets of LV2 signals, and generating, by the computing system, a LV2 signal report detailing a set of inconsistencies based on an analysis of the generated LV2 variable map.

In some implementations, the plurality of lists of signals includes at least two of a CAN mapping list, an HWIO mapping list, an IP/IC mapping list, and an SPI mapping list. In some implementations, the plurality of lists of signals includes the CAN mapping list, the HWIO mapping list, the IP/IC mapping list, and the SPI mapping list.

In some implementations, the LV2 signal report includes, for each identified inconsistency, a recommendation to either (i) not change the particular inconsistency, (ii) add an output corresponding to the particular inconsistency, and (iii) remove the inconsistency. In some implementations, the LV2 application software module is a secondary application software module that is configured for verification of an output of at least one corresponding LV1 or primary application software module for functional safety requirements.

In some implementations, the LV2 application software module is a model-type file. In some implementations, each of the plurality of lists of signals is a spreadsheet-type file. In some implementations, the LV2 signal report is a spreadsheet-type file.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As previously discussed, vehicle software is generally divided into base software (BSW) and two levels of application software (ASW), and these two levels of ASW can be divided into Level 1 (LV1) or primary ASW and Level 2 (LV2) or secondary ASW. The primary purpose of the LV2 ASW is for validation of the LV1 ASW outputs for functional safety. For example only, functional safety could involve the verification of a control output for a powertrain or driveline of the vehicle (acceleration, braking, steering, stability control, etc.), as well as electronic systems such as advanced driver-assistance (ADAS) and autonomous driving systems. A controller area network (CAN) of a vehicle is configured to transmit a very large quantity (e.g., hundreds or thousands) of different types of signals, and many of these signals are utilized by multiple software modules. During vehicle development, different teams may be tasked with the development of a particular set of software modules. Currently, analysis of these CAN signals, such as for functional safety verification, is performed manually by human operators and in a distributed (e.g., team-by-team) manner. This process is slow (e.g., 1-2 weeks minimum) and increases exponentially as vehicles incorporate more CAN signals and controllers.

Accordingly, improved systems and methods for analyzing the structure of a vehicle CAN are presented herein. Specifically, a CAN structure generation/automation tool is presented that automatically checks for mismatches between BSW, LV1 ASW, and LV 2 ASW modules. This tool helps mitigates the removal of wanted CAN signals due to unintended inconsistencies (which could lead to loss of functionality or functional safety) and mitigates unnecessary variable definitions being saved in memory as a result to inconsistencies (which could lead to decreased computing performance). The required inputs for this tool are a LV2 2 ASW module (e.g., a model-type file) for analysis and a plurality of lists (e.g., spreadsheet-type files) CAN mapping, hardware input/output (HWIO) mapping, serial peripheral interface (SPI) mapping, and inter-processor/core mapping. The tool receives these inputs and processes each to extract all the LV2 variables and signals, identifies inconsistencies ("stubs"), and generates a LV2 signal report detailing the inconsistencies and, in some cases, providing recommendations (per a specific set of stubbing rules) for easy viewing/analysis by all of the teams. This tool is therefore able to check all possible mismatches and cover all corner cases between the interfaces between LV1 ASW modules, LV2 ASW modules, and BSW modules and ensure that the core functionality remains intact.

Figure 1:
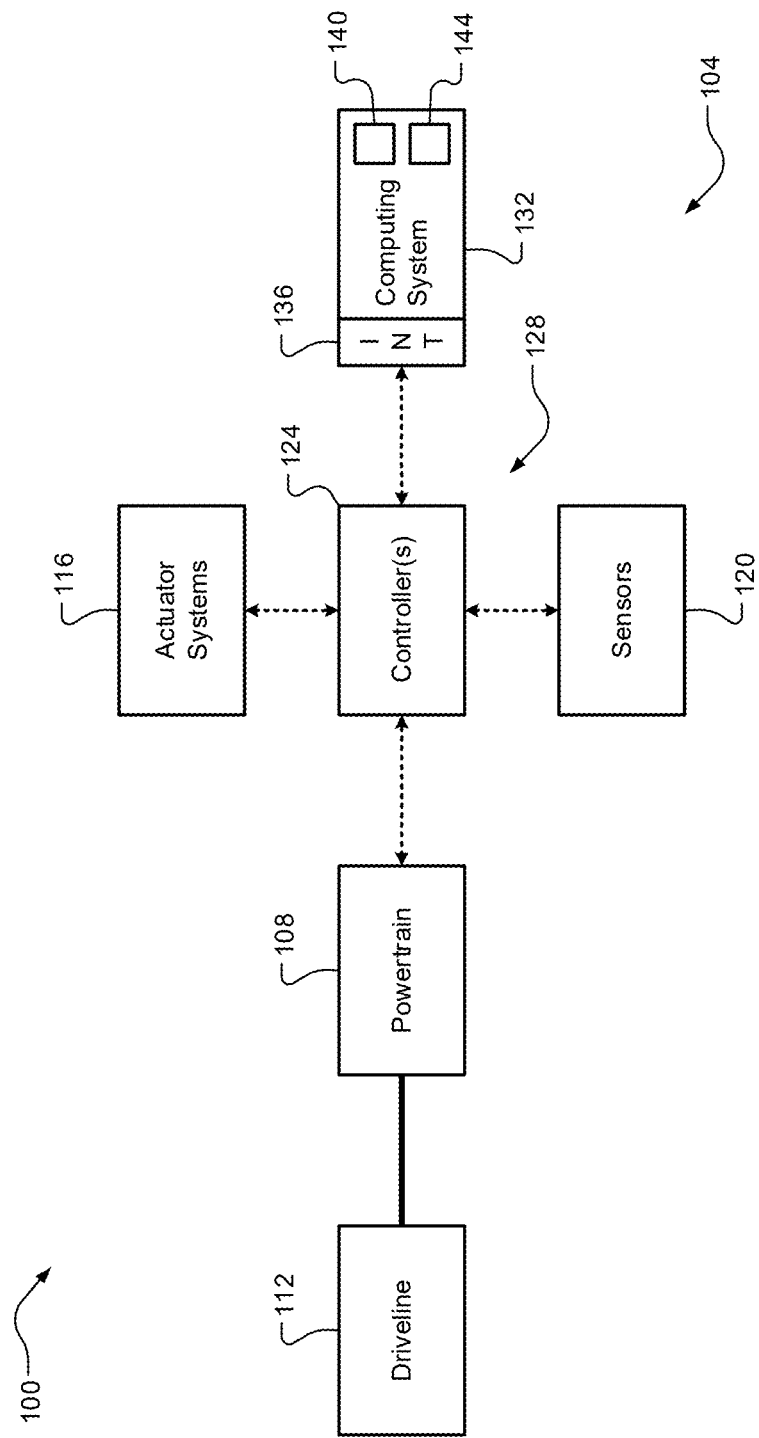
FIG. 1 is a functional block diagram of a vehicle having one or more controllers configured to be programmed by an external computing system according to the principles of the present application.

Referring now to FIG. 1, a functional block diagram of a vehicle 100 having an example system 104 for analyzing a vehicle CAN structure according to the principles of the present application is illustrated. The vehicle 100 generally includes a powertrain 108 configured to generate and transfer drive torque to a driveline 112 for vehicle propulsion. Non-limiting examples of the components of the powertrain 108 include an electric motor, an internal combustion engine, and combinations thereof, and a gear reducer or transmission. The vehicle 100 also includes a plurality of actuator systems 116 and a plurality of sensors 120 that are interface with by a set of one or more controllers 124 (hereinafter, "controller 124") via a controller area network (CAN) 128 to control operation of the vehicle 100 including different functionalities (motor torque management, engine torque management, etc.). The controllers 124 and the CAN 128 could be arranged, for example, according to the AUTomotive Open System ARchitecture (AUTOSAR®) standard.

An external computing system 132 (e.g., one or more computing devices) is configured to program the controller 124 (e.g., generate software code therefor) via an interface (INT) 136. The external computing system 132, for example, is configured to execute the CAN structure generation/automation tool described in greater detail below, and the computing system 132 could include a non-transitory computer-readable medium 140 (e.g., a memory) storing instructions that, when executed by one or more processors 144, cause the one or more processors to execute a plurality of operations.

Figure 2:
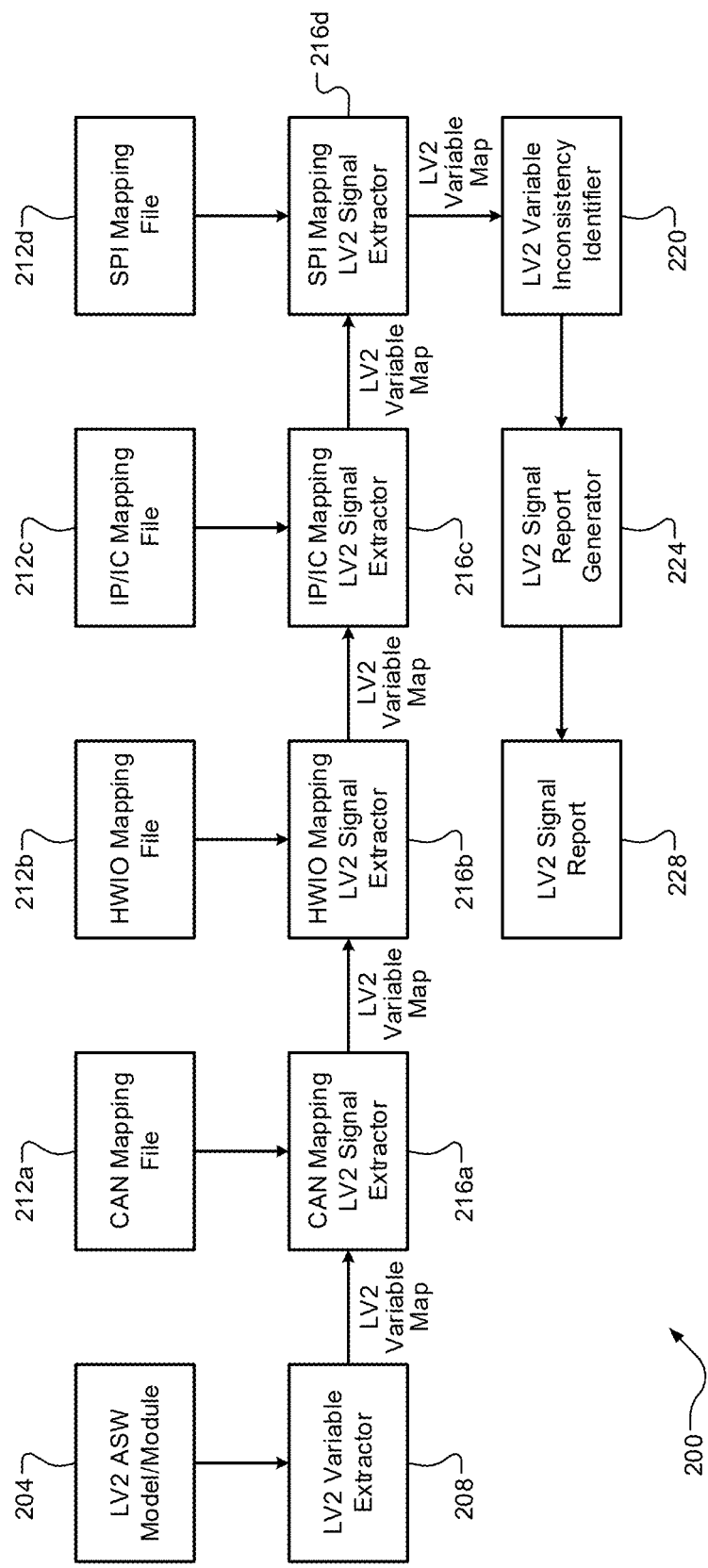
FIG. 2 is a functional block diagram of an example architecture for a vehicle CAN structure generation/automation tool according to the principles of the present application.

Referring now to FIG. 2, a functional block diagram of an example architecture 200 of a vehicle CAN structure generation/automation tool according to the principles of the present application is illustrated. This architecture 200 could represent, for example, software code executable by the computing system 132 during development and generation of the software code for the controller(s) 124 of the vehicle 100. The process begins by obtaining a LV2 ASW model or module 204. This could be, for example, a model-type file. A LV2 variable extractor block 208 receives and processes the LV2 ASW module 204 and extracts therefrom a plurality of LV2 variables into a LV2 variable map. This LV2 variable map, or LV2 interface list, includes inputs of all of the various LV2 monitoring software modules and functional safety software modules. The LV2 variable map is passed along and added to with other LV2 signal data. More specifically, a plurality of mapping lists (e.g., spreadsheet-type files) 212a-212d are provided to respective LV2 signal extractors 216a-216d, which process the received mapping lists to extract LV2 signals and add them to the LV2 variable map.

As shown, the mapping lists 212 include a CAN mapping file 212a, a HWIO mapping file 212b, an inter-processor/core (IP/IC) mapping file 212c, and an SPI mapping file 212d. It will be appreciated that the number of lists and corresponding extractors could vary depending on how the development teams for the vehicle 100 are divided. A final LV2 variable map is output from extractor 216d and provided to a LV2 variable inconsistency identifier block 220. This inconsistency identifier block 220 identifies inconsistencies between the LV2 variables and the corresponding LV2 signals. This inconsistency identification could be performed based on a set of rules, which are discussed in greater detail below. Each inconsistency can also be described as a "stub" as it represents a piece of data or information that is missing a link. For example only, the set of rules for the inconsistency or stub identification could be as follows:

| Present In Model? | Present in Mapping Sheets? | Stub Present? | Stub Output | Recommendation |
|---|---|---|---|---|
| Yes | Yes | Yes | Remove | No action required |
| Yes | Yes | No | No change | No action |

-continued

| Present In Model? | Present in Mapping Sheets? | Stub Present? | Stub Output | Recommendation |
|---|---|---|---|---|
| Yes | No | Yes | No change | No action required |
| Yes | No | No | Add stub | Talk to Developer |
| No | Yes | Yes | No change | Ask Developer to change mapping sheet |
| No | Yes | No | Add Stub | Ask Developer to Change Mapping Sheet |
| No | No | Yes | Remove | No action required |
| No | No | No | No change | No action required |

The LV2 signal report generator block 224 receives a list (e.g., a spreadsheet-type file) of identified inconsistencies or stubs from block 220 and, in turn, generates a LV2 signal report 224, which could also be a spreadsheet-type file or similar. This LV2 signal report 224 could be shared amongst the various development teams for the vehicle 100, and each development team can take any action necessary (e.g., updating their respective mapping lists/files) for future use and also diagnosing other errors. The table below illustrates the impact of the inconsistency (stub) identifications and whether there was an impact on the final software code (e.g., fixing errors and/or removing unnecessary variable definitions causing excess memory consumption).

| Present In Model Before? | Stubbed? | Impact Before? | In Model Currently? | Stubbed? | Impact Currently? |
|---|---|---|---|---|---|
| No | No | No | No | No | NO |
| No | No | No | No | Yes | NO |
| No | No | No | Yes | No | YES |
| No | No | No | Yes | Yes | NO |
| No | Yes | No | No | No | NO |
| No | Yes | No | No | Yes | NO |
| No | Yes | No | Yes | No | YES |
| No | Yes | No | Yes | Yes | NO |
| Yes | No | Yes | No | No | YES |
| Yes | No | Yes | No | Yes | YES |
| Yes | No | Yes | Yes | No | NO |
| Yes | No | Yes | Yes | Yes | YES |
| Yes | Yes | No | No | No | NO |
| Yes | Yes | No | No | Yes | NO |
| Yes | Yes | No | Yes | No | YES |
| Yes | Yes | No | Yes | Yes | NO |

Figure 3:
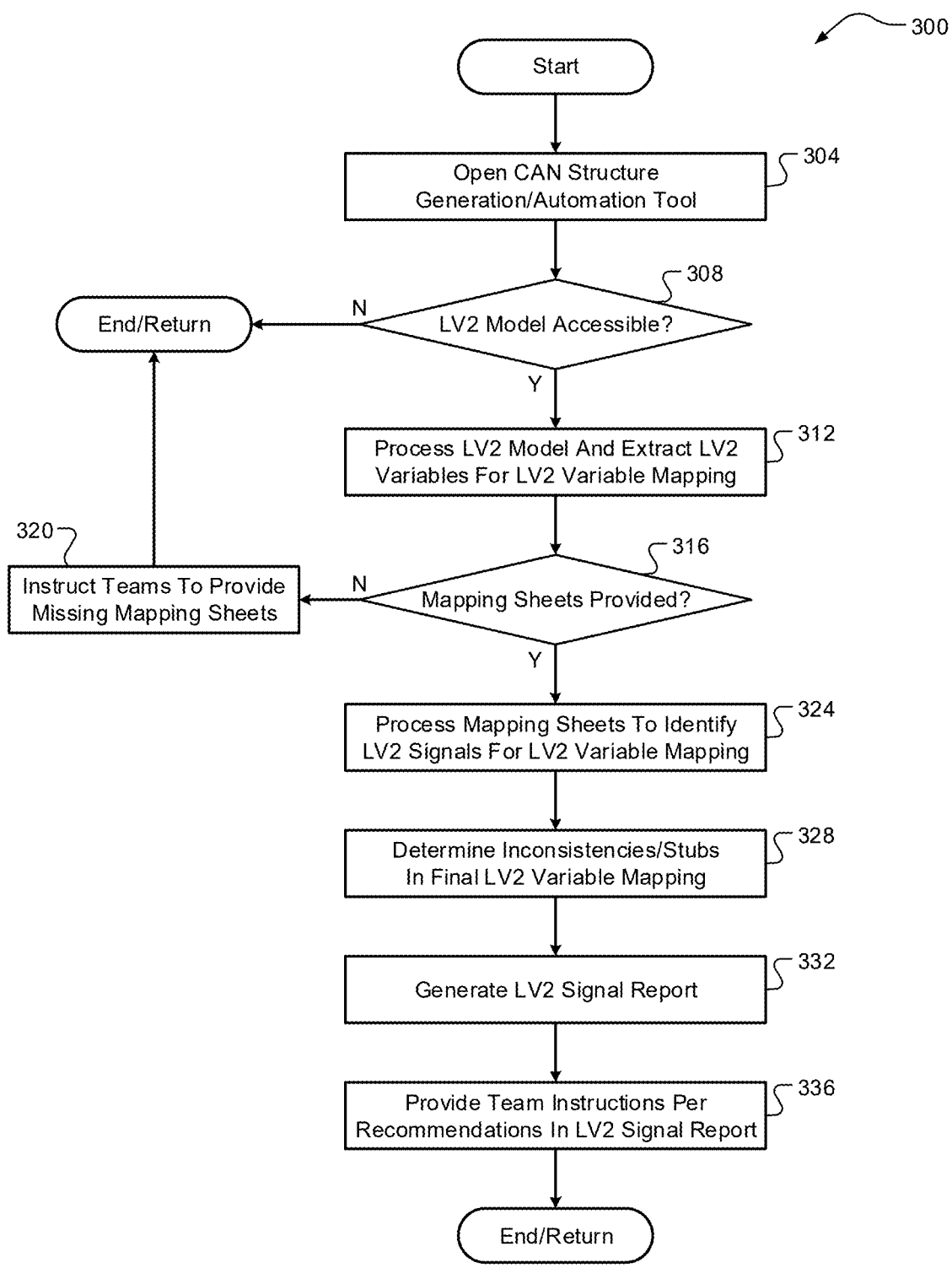
FIG. 3 is a flow diagram of an example computer-implemented method for analyzing a structure of a CAN of a vehicle according to the principles of the present application.

Referring now to FIG. 3, a flow diagram of an example method 300 for analyzing a structure of a vehicle CAN according to the principles of the present application is illustrated. While the method 300 specifically references the vehicle 100 and architecture 200 and their respective sub-components for illustrative and descriptive purposes, it will be appreciated that the method 300 could be applicable to any suitably configured computing system and vehicle. The method 300 begins at 304. At 304, the tool 200 is opened/launched (e.g., by the computing system 132). At 308, the tool 200 determines whether a LV2 ASW module (e.g., a model-type file) has been selected or provided for analysis. When false, the method 300 ends or returns to 304. When true, the method 300 proceeds to 312.

At 312, the tool 200 processes the LV2 ASW module and extracts LV2 variables therefrom to obtain a LV2 variable mapping. At 316, the tool 200 determines whether the plurality of mapping lists or sheets are provided and accessible. When false, the method 300 proceeds to 320 where an optional output could be generated instructing the relevant team(s) to provide the missing mapping list(s)/sheet(s) and the method 300 ends or returns to 304. When true, the method 300 proceeds to 324. At 324, the tool 200 processes each mapping list or sheet to identify LV2 signals and adds them to the LV2 variable mapping. At 328, the tool 200 determines inconsistencies or stubs in the final LV2 variable mapping.

At 332, based on the determined inconsistencies or stubs, the tool 200 generates a LV2 signal report. This LV2 signal report, for example, could be saved and/or output to the plurality of development teams for further usage. At optional 336, specific instructions could be automatically generated for any development team(s) that need to update their mapping lists/sheets or do further error correction or memory reduction. The method 300 then ends or returns to 304 for one or more additional cycles (e.g., to analyze another LV2 ASW module).

It will be appreciated that the terms "controller" and "control system" as used herein refer to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture or single or multiple processor cores operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A system for analyzing a structure of a vehicle controller area network (CAN), the system comprising:
   a non-transitory computer-readable medium having a set of instructions stored thereon; and
   one or more processors configured to execute the set of instructions, which causes the one or more processors to:
   obtain a level 2 (LV2) application software module;
   process the LV2 application software module to extract a set of LV2 variables from the LV2 application software module;
   obtain a plurality of lists of signals corresponding to a plurality of development teams of the vehicle;
   process the plurality of lists of signals to extract respective sets of LV2 signals from the plurality of lists of signals;
   generate a LV2 variable map based on the extracted set of LV2 variables and the extracted sets of LV2 signals; and
   generate a LV2 signal report detailing a set of inconsistencies based on an analysis of the generated LV2 variable map.

2. The system of claim 1, wherein the plurality of lists of signals includes at least two of a CAN mapping list, a hardware input/output (HWIO) mapping list, an inter-processor/core (IP/IC) mapping list, and a serial peripheral interface (SPI) mapping list.

3. The system of claim 2, wherein the plurality of lists of signals includes the CAN mapping list, the HWIO mapping list, the IP/IC mapping list, and the SPI mapping list.

4. The system of claim 1, wherein the LV2 signal report includes, for each identified inconsistency, a recommendation to either (i) not change the particular inconsistency, (ii) add an output corresponding to the particular inconsistency, and (iii) remove the inconsistency.

5. The system of claim 1, wherein the LV2 application software module is a secondary application software module that is configured for verification of an output of at least one corresponding level 1 (LV1) or primary application software module for functional safety requirements.

6. The system of claim 1, wherein the LV2 application software module is a model-type file.

7. The system of claim 1, wherein each of the plurality of lists of signals is a spreadsheet-type file.

8. The system of claim 1, wherein the LV2 signal report is a spreadsheet-type file.

9. A computer-implemented method for analyzing a structure of a vehicle controller area network (CAN), the computer-implemented method comprising:
- obtaining, by a computing system comprising one or more processors, a level 2 (LV2) application software module;
- processing, by the computing system, the LV2 application software module to extract a set of LV2 variables from the LV2 application software module;
- obtaining, by the computing system, a plurality of lists of signals corresponding to a plurality of development teams of the vehicle;
- processing, by the computing system, the plurality of lists of signals to extract respective sets of LV2 signals from the plurality of lists of signals;
- generating, by the computing system, a LV2 variable map based on the extracted set of LV2 variables and the extracted sets of LV2 signals; and
- generating, by the computing system, a LV2 signal report detailing a set of inconsistencies based on an analysis of the generated LV2 variable map.

10. The computer-implemented method of claim 9, wherein the plurality of lists of signals includes at least two of a CAN mapping list, a hardware input/output (HWIO) mapping list, an inter-processor/core (IP/IC) mapping list, and a serial peripheral interface (SPI) mapping list.

11. The computer-implemented method of claim 10, wherein the plurality of lists of signals includes the CAN mapping list, the HWIO mapping list, the IP/IC mapping list, and the SPI mapping list.

12. The computer-implemented method of claim 9, wherein the LV2 signal report includes, for each identified inconsistency, a recommendation to either (i) not change the particular inconsistency, (ii) add an output corresponding to the particular inconsistency, and (iii) remove the inconsistency.

13. The computer-implemented method of claim 9, wherein the LV2 application software module is a secondary application software module that is configured for verification of an output of at least one corresponding level 1 (LV1) or primary application software module for functional safety requirements.

14. The computer-implemented method of claim 9, wherein the LV2 application software module is a model-type file.

15. The computer-implemented method of claim 9, wherein each of the plurality of lists of signals is a spreadsheet-type file.

16. The computer-implemented method of claim 9, wherein the LV2 signal report is a spreadsheet-type file.

* * * * *